United States Patent Office 3,478,040
Patented Nov. 11, 1969

3,478,040
GLYCERYL 2-(x,y,z-SUBSTITUTED ANILINO) NICOTINATES
Margaret H. Sherlock, Bloomfield, N.J., assignor to Schering Corporation, Bloomfield, N.J., a corporation of New Jersey
No Drawing. Filed Apr. 10, 1967, Ser. No. 629,383
Int. Cl. C07d 31/42, 31/34; A61k 27/00
U.S. Cl. 260—295.5
9 Claims

ABSTRACT OF THE DISCLOSURE

The invention relates to glyceryl esters of substituted 2-anilinonicotinic acids, to their use as analgesic antiinflammatory agents, and to the intermediates useful in the preparation thereof. Illustrative of the preparation of those compounds is the formation of glyceryl-2-(2-methyl-3-chloroanilino) nicotinate, as follows: Reflux a mixture containing 2-(2-methyl-3-chloroanilino) nicotinic acid, chloroacetonitrile in the presence of triethylamine to produce cyanomethyl-2-(2-methyl-3-chloroanilino) nicotinate which, by heating with 2,2-dimethyl-1,3-dioxolane-4-methanol in the presence of potassium carbonate, produces β,γ-isopropylidenedioxypropyl-2-(2-methyl-3-chloroanilino) nicotinate. Hydrolysis of the β-isopropylidenedioxypropyl - 2(2 - methyl-3-chloroanilino) nicotinate with 0.5 N hydrochloric acid yields glyceryl-2-(2-methyl-3-chloroanilino) nicotinate. Alternate methods for the preparation of the glyceryl esters of the substituted 2-anilinonicotinic acids are also described.

FIELD OF INVENTION

This invention relates to compositions of matter identifiable in the art of chemistry as glyceryl esters of substituted 2-anilinonicotinic acids, to the processes and intermediates useful for the preparation thereof, and to the therapeutic use of such compositions.

SUMMARY OF INVENTION

The invention sought to be patented in one of its composition of matter aspects is described as residing in the concept of a chemical compound having the molecular structure of a glyceryl ester of a substituted 2-anilino nicotinic acid having in the anilino portion of the molecule, X, Y and Z substituents in the phenyl group thereof, wherein X is a member of the group consisting of lower alkyl, lower alkoxy, nitro, halogeno, trifluoromethyl, and Y and Z are each members of the group consisting of halogen, lower alkyl, trifluoromethyl, and hydrogen.

The invention sought to be patented in another of its composition aspects resides in the concept of pharmaceutical dosage forms containing a novel compound of this invention.

The invention sought to be patented in one of its process aspects is described as residing in the concept of subjecting a reactive ester of an appropriately X and Y substituted 2-anilinonicotinic acid to a transesterification reaction which, depending upon the alcohol employed, will produce either the glyceryl ester directly, or will produce an intermediate which, upon hydrolysis, is convertible thereinto.

In another of its process aspects this invention relates the the condensation of β-γ-alkylidenedioxypropyl-2-chloronicotinate with an appropriately substituted aniline to form a β-γ-alkylidenedioxypropyl-2-anilino nicotinate, which upon hydrolysis, forms a desired glyceryl ester of this invention. In another of its process aspects this invention relates to the condensation of glyceryl 2-chloronicotinate with an appropriately substituted aniline to form a desired glyceryl ester of this invention.

In another of its process aspects this invention relates to the condensation of a reactive ester of 2-chloronicotinic acid with an appropriately substituted aniline to form an intermediate which, upon transesterification and subsequent hydrolysis, will produce a desired compound of this invention.

In another of its process aspects this invention relates to the process wherein an anhydride of a 2-anilino-nicotinic acid is reacted with glycerol, or a cyclic acetal thereof, to produce a desired compound of this invention, or a compound which, upon hydrolysis produces a desired compound of this invention, respectively.

In still another process aspect this invention relates to the process wherein an acyl isourea is reacted with 2-anilinonicotinic acid to form an alkylidenedioxypropyl ester of the anilinonicotinic acid which, upon hydrolysis produces the desired compound of this invention.

The invention sought to be patented in its method-of-use aspect is described as residing in the concept of treating and alleviating inflammation and inflammatory conditions in mammals by administering a therapeutically effective quantity of a novel compound of this invention. Another aspect is that wherein a novel compound of this invention is used to cause an analgesic effect. Still another use aspect is that wherein a novel compound of this invention is used to cause an anti-pyretic effect. Another use aspect of this invention is the use of compositions which, in addition to the novel compounds of this invention, contain other active ingredients to provide desirable complementary effects when employed in the treatment of inflammatory conditions and in the treatment of pain.

DESCRIPTION OF THE PREFERRED EMBODIMENTS

A more specific representation of the tangible embodiments of this invention are the chemical compositions of matter having the structural formula:

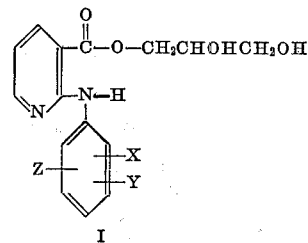

I and the pharmaceutically acceptable acid addition salts thereof, wherein X is a member of the group consisting of lower alkyl, lower alkoxy, halogen, nitro, trifluoromethyl, and each of Y and Z are members of the group consisting of lower alkyl, halogeno, trifluoromethyl and hydrogen.

The desired glyceryl esters of this invention (I) may be prepared from any one of several different routes of synthesis, the choice being determined by the ready availability of the required starting compounds. Preferentially the desired compounds are prepared by the hydrolysis of an alkylidenedioxypropyl ester of a 2-anilinonicotinic acid, said ester being formed by the transesterification of a reactive ester of a 2-(X, Y and Z-substituted anilino) nicotinic acid (IV) with a cyclic acetal of glycerol (V). The transesterification reaction is generally effected by heating the reactive ester of the appropriate 2-(X, Y and Z-substituted anilino) nicotinic acid with a cyclic acetal of glycerol in the presence of catalytic amounts of an anhydrous alkaline catalyst, such as potassium carbonate, at temperatures in the range of 80–250° C., although it is preferred to heat the reactants at about 100° C. As the ester interchange is reversible it is preferred to employ large excess quantities of the cyclic acetal. The reaction may also be effected in high boiling reaction-inert solvents. However, due to the excess quantities of the cyclic acetal reactant utilized, a separate solvent is generally not required. The hydrolysis of the alkylidenedioxy propyl esters (VI) to the desired glyceryl-2-anilinonicotinate is effected by standard techniques, such as by heating the intermediate in the presence of an acid. Representative of such techniques are the hydrolysis of the ester (VI) in acetone with p-toluenesulfonic acid at room temperature; hydrolysis of the ester (VI) in dioxane at room temperature for 3 hours, and hydrolysis of the ester (VI) in sodium acetate with acetic acid at 80° C. for up to ½ hour.

In practice, it is preferred to employ cyanomethyl esters of the 2-anilinonicotinic acid, although other equivalently functioning reactive esters may also be employed. Among such equivalently functioning esters are those

R'—COOCH$_2$R esters wherein R is acyl, carbamyl, acyloxy, carbalkoxy, and the like and R' is representative of the α-(2-anilino-3-pyridyl) moiety of the 2-anilinonicotinate.

The foregoing reaction scheme may be depicted as follows:

Reaction scheme A

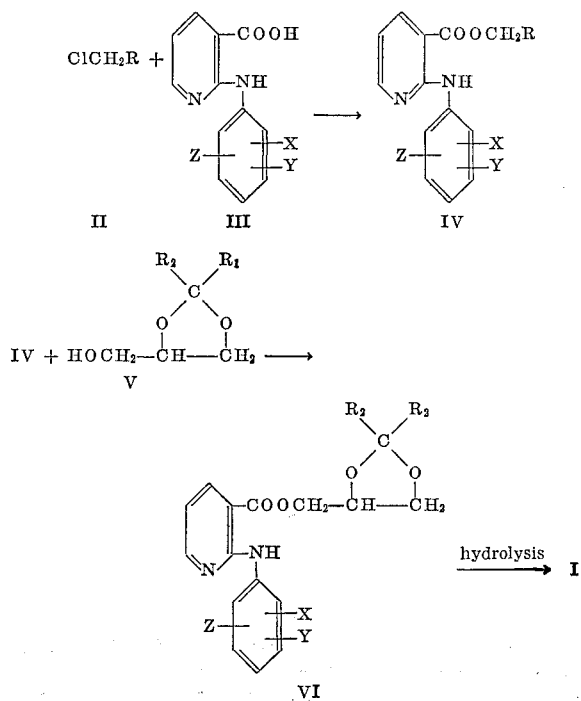

wherein X, Y, Z and R are as previously defined and R$_1$ and R$_2$ are lower alkyl. Representative of those compounds embraced by Formula II are chloroacetonitrile, chloroacetone, α-chloroacetamide, chloroacetophenone and ethylchloroacetate, respectively.

The intermediary reactive esters (IV) may be prepared by standard techniques such as by reaction of the appropriate X, Y and Z substituted 2-anilinonicotinic acid with chloroacetonitrile by heating the reaction mixture at about 60–100° C. in the presence of triethylamine; optionally, a reactive ester of 2-chloronicotinic acid may be condensed with an appropriately X, Y, and Z-substituted aniline according to known techniques to produce the desired reactive ester (IV).

Alternatively, the desired glyceryl-2-anilinonicotinates (I) may be prepared by transesterifying the reactive esters of 2-anilinonicotinic acid (IV) with glycerol.

Alternatively, another method for the preparation of the desired compounds of this invention is the process wherein, in the presence of pyridine, an appropriate carbodiimide is reacted with a 2-anilinonicotinic acid (III) to form an isoureayl-2-anilinonicotinate, which ester without isolation is then reacted with glycerol to produce the desired products (I) or else they are reacted with a cyclic acetal of glycerol (V) to form an alkylidenedioxypropyl-2-anilinonicotinate (VI), which, upon hydrolysis, produces the desired compound. In effecting the formation of the isoureayl-2-anilinonicotinate, equimolar quantities of the reactants are heated (preferably at about reflux temperatures) using pyridine as a base solvent, although other equivalently functioning bases may also be used. It is preferred to employ N,N'-dicyclohexylcarbodiimide, although other equivalently functioning carbodiimides may be similarly employed. The ester interchange reaction of the so-formed isoureayl-2-anilinonicotinate with glycerol, or cyclic acetal thereof, is effected according to standard techniques well known in the art.

Alternatively, the alkylidenedioxypropyl esters of 2-anilinonicotinic acids (VI) may also be prepared by reacting the appropriate cyclic acetal (V) with a 2-anilinonicotinic acid anhydride wherein one half molar proportions of the anhydride is caused to react with molar proportions of the cyclic acetal of glycerol according to standard procedures such as by heating the reactants in the presence of zinc chloride. Preferably, the reaction takes place in an organic solvent about the reflux temperature of the reaction mixture. The required anilinonicotinic acid anhydrides may readily be prepared by intimately contacting two molar proportions of 2-anilinonicotinic acid with one molar proportion of the carbodiimide and permitting the reaction to occur at room temperature, although it is preferred to have the reaction take place slowly at temperatures below room temperature. In practice N,N'-dicyclohexylcarbodiimide is a convenient reactant suitable for use in this reaction, but other well known equivalently-functioning N,N'-disubstituted carbodiimides may also be employed. Upon completion of the reaction, the urea by-product is removed and the anhydride is ready for use without further purification.

Still another alternate process for the preparation of the alkylidenedioxypropyl esters of 2-anilinonicotinic acids (VI) is that process wherein an alkyl isourea is reacted with a 2-anilinonicotinic acid. The formation of the intermediate alkyl isourea is readily effected by admixing equilmolar quantities of a carbodiimide and a cyclic acetal of glycerol (V) at room temperature in the presence of catalytic quantities of cuprous chloride. In the formation of the O-(β,γ-alkylidenedioxypropyl) isourea it is preferred to employ N,N'-dicyclohexylcarbodiimide but other equivalently functioning carbodiimides may also be used. Similarly, 2,2-dimethyl-1,3-dioxolane-4-methanol is a preferred cyclic acetal of glycerol but other 2,2-dialkyl-1,3-dioxolane-4-methanol reactants may also be employed. The so-formed O-β,γ-alkylideneoxypropyl isourea is caused to react with a 2-anilino nicotinic acid (III) by heating the reactants at about room temperature to about 150° C., said reaction taking place in an inert organic solvent such as dioxane. The so-formed alkylidenedioxypropyl esters of 2-anilinonicotinic acids (VI) may be hydrolyzed to the desired compound (I) according to standard techniques such as by heating the ester in a low boiling solvent such as benzene in the presence of p-toluenesulfonic acid hydrate.

Exemplary of the foregoing is that reaction wherein dicyclohexylcarbodiimide is reacted with 2,2-dimethyl-1,3-dioxolane-4-methanol in the presence of cuprous chloride to form O(β-γ-isopropylidenedioxypropyl)-N,N'-dicyclohexyl-isourea. The so-formed O(β-γ-isopropylidenedioxypropyl)-N,N'-dicyclohexyl isourea and the 2(2-methyl-3-chloroanilino)-nicotinic acid are heated at about 100° C. in dioxane to form β-γ-isopropylidenedioxypropyl - 2(2 - methyl - 3-chloroanilino)-nicotinate, which compound is hydrolyzed as previously described.

It is of course understood that since the glycerol esters can exist in d- and l forms, the particular d- and l-isomer of the appropriate glycerol reactant may be employed to obtain the desired optical isomer of the glyceryl-2-anilino-nicotinate.

The required 2-(X,Y,Z-substituted anilino) nicotinic acid intermediates are prepared by condensing a 2-halo-nicotinic acid with the appropriate X,Y,Z-substituted aniline, the condensation being effected by heating a mixture of at least equimolar quantities of the reactants. Preferably, the compounds are prepared by heating a 2-chloro-nicotinic acid of a 2-bromonicotinic acid with the appropriate X,Y,Z-substituted aniline, said heating taking place in a high boiling solvent such as glycols (e.g. ethylene glycol, propylene glycol and the like) and aromatic hydrocarbons (e.g. xylene or cymene), or by merely melting the reactants in the presence of each other by the usual and standard techniques. In the melting procedure the reaction temperature will rise as the reaction proceeds. The reaction is completed generally after 15–30 minutes as evidenced by a fall in reaction temperature. The fused melt is then treated with dilute aqueous base, for example, sodium carbonate or sodium hydroxide and extracted with a water immiscible solvent. The product, in the form of a soluble salt, is in the aqueous layer and is precipitated therefrom by acidifying with dilute mineral acid, filtered and recrystallized. During the course of the reaction of each mole of reaction product there is formed a mole of hydrogen halide. Accordingly, it is preferred to employ 2 moles of X,Y,Z-substituted aniline for each mole of the 2-substituted nicotinic acid reactant. The extra mole of the former readily takes up the hydrogen halide formed in the form of an acid addition salt. The compounds contemplated as falling within Formula I are weakly basic in character and form acid addition salts. Accordingly the pharmaceutically acceptable acid addition salts of the free bases are contemplated as being within the concept in its composition aspect. Such salts include those derived from maleic, salicylic, succinic, methyl sulfonic, tartaric, citric, hydrochloric, hydrobromic, sulfuric, phosphoric and the like.

The following examples are illustrative of the methods of synthesis of the tangible embodiments of this invention:

A: PREPARATION OF ANILINONICOTINIC ACIDS

Example 1.—2-(2-methyl-3-chloroanilino) nicotinic acid

Mix 15.7 g. (0.1 mole) of 2-chloronicotinic acid with 28.2 g. (0.2 mole) of 2-methyl-3-chloroaniline. Stir the mixture and heat to 120–130° C. (The temperature will rise to about 175–200° C. as the reaction proceeds.) After the reaction is completed as evidenced by a fall in temperature, cool the mass and triturate in dilute hydrochloric acid. Filter and wash the solid with water. Recrystallize from isopropyl acetate, M.P. 233–235° C.

Alternatively, the compound of this example 2-(2-methyl-3-chloroanilino) nicotinic acid is prepared by heating together 30 g. of ethyl-2-chloronicotinate and 45.6 g. of 2-methyl-3-chloroaniline at 200° C. for 10 minutes. Cool, dissolve in 100 ml. hot ethanol, cool and filter obtaining the ethyl ester of this example, M.P. 77.5–79° C.

Dissolve 30.8 g. of the ethyl ester in a solution of 13.25 g. of potassium hydroxide in 1 liter of methanol. Heat on a steam bath overnight allowing the methanol to evaporate. Dissolve the residue in water, acidify with dilute hydrochloric acid and filter, obtaining the acid of this example.

Similarly by substituting the aniline reactants of Example 1 with equivalent quantities of 2-methyl-3-trifluoromethylaniline;
2-methyl-3-bromoaniline;
2-methoxy-3-chloroaniline;
2-chloro-3-nitroaniline;
2,3-dichloroaniline;
2,3-dibromoaniline;
2,3-di-trifluoromethylaniline;
2,3-dimethylaniline;
3-methyl-5-chloroaniline;
3-methyl-5-nitroaniline;
3-methyl-5-bromoaniline;
3-trifluoromethylaniline;
3-methyl-5-trifluoromethylaniline;
3,5-dimethylaniline;
3-methoxy-5-chloroaniline;
3-chloro-5-nitroaniline;
3,5-dichloroaniline;
3,5-dibromoaniline;
3,5-ditrifluoromethylaniline;
2,6-dichloroaniline;
2,6-dimethylaniline;
2-methyl-3-nitroaniline;
2-methyl-3-chloroaniline;
2-methyl-3-nitro-6-chloroaniline;
2,3-dichloro-6-nitroaniline;
2,3-dimethyl-6-nitroaniline;
2-chloro-6-nitroaniline;
2-methyl-6-nitroaniline;
2-ethyl-6-nitroaniline;
2,6-dichloroaniline;
3,5-dimethyl-6-nitroaniline;
3,5-dichloro-6-nitroaniline; and
2,6-dichloro-3-methylaniline, and by substantially following the procedures outlined therein, there is produced 2-(2-methyl-3-trifluoromethylanilino) nicotinic acid;
2-(2-methyl-3-bromoanilino) nicotinic acid;
2-(2-methoxy-3-chloroanilino) nicotinic acid;
2-(2-chloro-3-nitroanilino) nicotinic acid;
2-(2,3-dichloroanilino) nicotinic acid;
2-(2,3-dibromoanilino) nicotinic acid;
2-(2,3-di-trifluoromethylanilino) nicotinic acid;
2-(2,3-dimethylanilino) nicotinic acid;
2-(3-methyl-5-chloroanilino) nicotinic acid;
2-(3-methyl-5-nitroanilino) nicotinic acid;
2-(3-methyl-5-bromoanilino) nicotinic acid;
2-(3-trifluoromethylanilino) nicotinic acid;
2-(3-methyl-5-trifluoromethylanilino) nicotinic acid;
2-(3,5-dimethylanilino) nicotinic acid;
2-(3-methoxy-5-chloroanilino) nicotinic acid;
2-(3-chloro-5-nitroanilino) nicotinic acid;
2-(3,5-dichloroanilino) nicotinic acid;
2-(3,5-dibromoanilino) nicotinic acid;
2-(3,5-di-trifluoromethylanilino) nicotinic acid;
2-(2-methyl-3-nitroanilino) nicotinic acid;
2-(2-methyl-3-chloroanilino) nicotinic acid;
2-(2-methyl-3-nitro-6-chloroanilino) nicotinic acid;
2-(2,3-dichloro-6-nitroanilino) nicotinic acid;
2-(2,3-dimethyl-6-nitroanilino) nicotinic acid;
2-(2-chloro-6-nitroanilino) nicotinic acid;
2-(2-methyl-6-nitroanilino) nicotinic acid;
2-(2-ethyl-6-nitroanilino) nicotinic acid;
2-(2,6-dichloroanilino) nicotinic acid;
2-(3,5-dimethyl-6-nitroanilino) nicotinic acid;
2-(3,5-dichloro-6-nitroanilino) nicotinic acid; and
2-(2,6-dichloro-3-methylanilino) nicotinic acid, respectively.

B: PREPARATION OF REACTIVE ESTER INTERMEDIATES

Example 2.—Cyanomethyl-2-(2-methyl-3-chloroanilino) nicotinate

A mixture of 30 g. of 2-(2-methyl-3-chloroanilino) nicotinic acid, 12.6 g. of chloroacetonitrile, 16.8 g. of triethylamine is stirred and heated at reflux temperature for four hours. The reaction mixture is poured into water and the product is filtered to yield cyanomethyl-2-(2-methyl-3-chloroanilino) nicotinate, M.P. 137°–138° C.

Similarly by substituting the 2-(2-methyl-3-chloroanilino) nicotinic acid reactant of this example with equivalent quantities of those 2-anilinonicotinic acids illustrated n Example 1, and by substantially following the procedure of this example, there is produced cyanomethyl-2-(2-methyl-3-trifluoromethylanilino) nicotinate;
cyanomethyl-2-(2-methyl-3-bromoanilino) nicotinate;
cyanomethyl-2-(2-methoxy-3-chloroanilino) nicotinate;
cyanomethyl-2-(2-chloro-3-nitroanilino) nicotinate;
cyanomethyl-2-(2,3-dichloroanilino) nicotinate;
cyanomethyl-2-(2,3-dibromoanilino) nicotinate;
cyanomethyl-2-(2,3-di-trifluoromethylanilino) nicotinate;
cyanomethyl-2-(2,3-dimethylanilino) nicotinate;
cyanomethyl-2(3-methyl-5-nitroanilino) nicotinate;
cyanomethyl-2(3-methylbromoanilino) nicotinate;
cyanomethyl-2(3-trifluoromethylanilino) nicotinate;
cyanomethyl-2-(3-methyl-5-trifluoromethylanilino) nicotinate;
cyanomethyl-2-(3,5-dimethylanilino) nicotinate;
cyanomethyl-2-(3-methoxy-5-chloroanilino) nicotinate;
cyanomethyl-2-(3-chloro-5-nitroanilino) nicotinate;
cyanomethyl-2-(3-dichloroanilino) nicotinate;
cyanomethyl-2-(3,5-di-bromoanilino) nicotinate;
cyanomethyl-2-(3,5-di-trifluoromethylanilino) nicotinate;
cyanomethyl-2-(2,6-dichloroanilino) nicotinate;
cyanomehtyl-2-(2,6-dimethylanilino) nicotinate;
cyanomethyl-2-(2-methyl-3-ntiroanilino) nicotinate;
cyanomethyl-2-(2-methyl-3-chloroanilino) nicotinate;
cyanomethyl-2-(2-methyl-3-nitro-6-chloroanilino) nicotinate;
cyanomethyl-2-(2,3-dichloro-6-nitroanilino) nicotinate;
cyanomethyl-2-(2,3-dimethyl-6-nitroanilino) nicotinate;
cyanomethyl-2-(2-chloro-6-nitroanilino) nicotinate;
cyanomethyl-2-(2-methyl-6-nitroanilino) nicotinate;
cyanomethyl-2-(2-ethyl-6-nitroanilino) nicotinate;
cyanomethyl-2-(2,6-dichloroanilino) nicotinate;
cyanomethyl-2-(3,5-dimethyl-6-nitroanilino) nicotinate;
cyanomethyl-2-(3,5-dichloro-6-nitroanilino) nicotinate;
cyanomethyl-2-(2,6-dichloro-3-methylanilino) nicotinate, respectively.

Alternatively, by substituting the chloroacetonitrile reactant with equivalent quantities of chloroacetone, chloroacetamide, phenacylchloride, and ethylchloroacetate, and by substantially following the procedure of this example, the following compounds are produced:

acetonyl-2-(2-methyl-3-chloroanilino) nicotinate;
carbamylmethyl-2-(2-methyl-3-trifluoromethylanilino) nicotinate;
phenacyl-2-(2-methyl-3-bromoanilino) nicotinate;
carbethoxymethyl-2-(2-methoxy-2-chloroanilino) nicotinate, respectively.

C: PREPARATION OF CYCLIC ACETAL INTERMEDIATES

Example 3.—β-γ-isopropylidenedioxypropyl-2-(2-methyl-3-chloroanilino) nicotinate A mixture of 6 g. of cyanomethyl-2-(2-methyl-3-chloroanilino) nicotinate, 18 g. of 2,2-dimethyl-1,3-dioxolane-4-methanol and 300 mg. of anhydrous potassium carbonate is stirred and heated on a steam bath for 1½ hours. The resulting mixture is treated with water, cooled and filtered to yield β-γ-isopropylidenedioxypropyl - 2 - (2 - methyl-3-chloroanilino) nicotinate, M.P. 98°–100° C.

Similarly by substituting the cyanomethyl-2-(2-methyl-3-chloroanilino) nicotinate with equivalent qantities of those cyanomethyl anilinonicotinates exemplified in Example 2, and by substantially following the procedure outlined in this example, there is produced β-γ-isopropylidenedioxypropyl-2-(2-methyl-3-nitroanilino) nicotinate;
β-γ-isopropylidenedioxypropyl-2-(2-methyl-3-trifluoromethylanilino) nicotinate;
β-γ-isopropylidenedioxypropyl-2-(2-methyl-3-bromoanilino) nicotinate;
β-γ-isopropylidenedioxypropyl-2-(2-methoxy-3-chloroanilino) nicotinate;
β-γ-isopropylidenedioxypropyl-2-(2-chloro-3-nitroanilino) nicotinate;
β-γ-isopropylidenedioxyproyl-2-(2,3-dichloroanilino) nicotinate;
β-γ-isopropylidenedioxypropyl-2-(2,3-dibromoanilino) nicotinate;
β-γ-isopropylidenedioxypropyl-2-(2,3-di-trifluoromethylanilino) nicotinate;
β-γ-isopropylidenedioxypropyl-2-(2,3-dimethylanilino) nicotinate;
β-γ-isopropylidenedioxypropyl-2-(3-methyl-5-chloroanilino) nicotinate;
β-γ-isopropylidenedioxyproyl-2-(3-methyl-5-nitroanilino) nicotinate;
β-γ-isopropylidenedioxypropyl-2-(3-methyl-5-bromoanilino) nicotinate;
β-γ-isopropylidenedioxypropyl-2-(3-trifluoromethylanilino) nicotinate;
β-γ-isopropylidenedioxypropyl-2-(3-methyl-5-trifluoromethylanilino) nicotinate;
β-γ-isopropylidenedioxyproyl-2-(3,5-dimethylanilino) nicotinate;
β-γ-isopropylidenedioxypropyl-2-(3-methoxy-5-chloroanilino) nicotinate;
β-γ-isopropylidenedioxypropyl-2-(3-chloro-5-nitroanilino) nicotinate;
β-γ-isopropylidenedioxypropyl-2-(3,5-dichloroanilino) nicotinate;
β-γ-isopropylidenedioxypropyl-2-(3,5-dibromoanilino) nicotinate;
β-γ-isopropylidenedioxypropyl-2-(3,5-di-trifluoromethylanilino) nicotinate;
β-γ-isopropylidenedioxypropyl-2(2,6-dichloroanilino) nicotinate;
β-γ-isopropylidenedioxypropyl-2-(2,6-dimethylanilino) nicotinate;
β-γ-isopropylidenedioxypropyl-2-(2-methyl-3-nitroanilino) nicotinate;
β-γ-isopropylidenedioxypropyl-2-(2-methyl-3-chloroanilino) nicotinate;
β-γ-isopropylidenedioxypropyl-2-(2-methyl-3-nitro-6-chloroanilino) nicotinate;
β-γ-isopropylidenedioxypropyl-2-(2,3-dichloro-6-nitroanilino) nicotinate;
β-γ-isopropylidenedioxypropyl-2-(2,3-dimethyl-6-nitroanilino) nicotinate;
β-γ-isopropylidenedioxypropyl-2-(2-chloro-6-nitroanilino) nicotinate;
β-γ-isopropylidenedioxypropyl-2-(2-methyl-6-nitroanilino) nicotinate;
β-γ-isopropylidenedioxypropyl-2-(2,6-dichloroanilino) nicotinate;
β-γ-isopropylidenedioxypropyl-2-(3,5-dimethyl-6-nitroanilino) nicotinate;
β-γ-isopropylidenedioxypropyl-2,(3,5-dichloro-6-nitroanilino) nicotinate; and
β-γ-isopropylidenedioxypropyl-2-(2,6-dichloro-3-methylanilino) nicotinate, respectively.

D: PREPARATION OF GLYCERYL ESTER FINAL PRODUCTS

Example 4.—Glyceryl-2-(2-methyl-3-chloroanilino) nicotinate

A mixture of 6.1 g. of β-γ-isopropylidenedioxypropyl-2-(2-methyl-3-chloroanilino) nicotinate and 60 ml. of 0.5 N hydrochloric acid is heated at 55–60° C. for one hour. The resulting solution is poured onto ice, neutralized, and the product is filtered, recrystallized from benzene to yield glyceryl-2-(2-methyl-3-chloroanilino) nicotinate, M.P. 113°–114° C.

Similarly, by substituting those β-γ-isopropylidenedioxy-2-anilinonicotinates listed in Example 3 and by hydrolyzing said esters substantially according to the procedure of this example, there is produced glyceryl-2-(2-methyl-3-nitroanilino) nicotinate;
glyceryl-2-(2-methyl-3-trifluoromethylanilino) nicotinate;
glyceryl-2-(2-methyl-3-bromoanilino) nicotinate;
glyceryl-2-(2-methoxy-3-chloroanilino) nicotinate;
glyceryl-2-(2-chloro-3-nitroanilino) nicotinate;
glyceryl-2-(2,3dichloroanilino) nicotinate;
glyceryl-2-(2,3-dibromoanilino) nicotinate;
glyceryl-2-(2,3-di-trifluoromethylanilino) nicotinate;
glyceryl-2-(2,3-dimethylanilino) nicotinate;
glyceryl-2-(3-methyl-5-chloroanilino) nicotinate;
glyceryl-2-(3-methyl-5-nitroanilino) nicotinate;
glyceryl-2-(3-methyl-5-bromoanilino) nicotinate;
glyceryl-2-(3-trifluoromethylanilino) nicotinate;
glyceryl-2-(3-methyl-5-trifluoromethylanilino) nicotinate;
glyceryl-2-(3,5-dimethylanilino) nicotinate;
glyceryl-2-(3-methoxy-5-chloroanilino) nicotinate;
glyceryl-2-(3-chloro-5-nitroanilino) nicotinate;
glyceryl-2-(3,5-dichloroanilino) nicotinate;
glyceryl-2-(3,5-dibromoanilino) nicotinate;
glyceryl-2-(3,5-di-trifluoromethylanilino) nicotinate;
glyceryl-2-(2,6-dichloroanilino) nicotinate;
glyceryl-2-(2,6-dimethylanilino) nicotinate;
glyceryl-2-(2-methyl-3-nitroanilino) nicotinate;
glyceryl-2-(2-methyl-3-chloroanilino) nicotinate;
glyceryl-2-(2-methyl-3-nitro-6-chloroanilino) nicotinate;
glyceryl-2-(2,3-dichloro-6-nitroanilino) nicotinate;
glyceryl-2-(2,3-dimethyl-6-nitroanilino) nicotinate;
glyceryl-2-(2-chloro-6-nitroanilino) nicotinate;
glyceryl-2-(2-methyl-6-nitroanilino) nicotinate;
glyceryl-2-(2,6-dichloroanilino) nicotinate;
glyceryl-2-(3,5-dimethyl-6-nitroanilino) nicotinate;
glyceryl-2-(3,5-dichloro-6-nitroanilino) nicotinate; and
glyceryl-2-(2,6-dichloro-3-methylanilino) nicotinate, respectively.

The tangible embodiments of this invention possess the inherent applied use characteristics of exerting an anti-inflammatory response as determined by pharmacological evaluation, and also exert analgesic and anti-pyretic actions. Thus, they are useful in treating inflammation and in treating certain symptoms of pain.

The treatment of inflammation with concomitant absence of side effects induced by the anti-inflammatory agent has been a goal long-sought. Until recently, steroids having cortisone-like activity had been employed for the treatment of inflammation. However, the use of steroids had the drawback of exhibiting side effects such as electrolyte imbalance, water retention and the like. Recently certain anilinonicotinic acids have been discovered to be effective anti-inflammatory agents, said agents being rather specific in their action as well as being free from the side effects due to steroid therapy. However, it has also been found that these 2-anilinonicotinic acid anti-inflammatory agents exhibit deleterious side effects such as for example, ulceration of the gastrointestinal tract, as well as possessing an extremely bitter taste upon oral administration. Thus, although these anilinonicotinic acids represented an improvement over steroid therapy, they themselves were not free from undesirable attributes. In an attempt to overcome some of the drawbacks to the use of these anilinonicotinic acids, the usual salts, esters and other derivatives were made. These derivatives however did not effectively eliminate the drawbacks; indeed, in most instances they proved to be less potent in their anti-inflammatory, anti-pyretic and analgesic effects without eliminating the undesirable side-effects.

By the employment of standard laboratory techniques it is to be found that, compared to its corresponding 2-anilinonicotinic acid, the glyceryl-2-anilino nicotinates of this invention have exhibited a marked lessening of the ulcerogenic effect upon the gastrointestinal tract and at the same time they have not exhibited significant decreases in their anti-inflammatory or anti-pyretic effects, nor has the glycerylation lowered the effectiveness of the compounds in their analgesic effects. In practice, based upon standard pharmacological animal studies, particularly in the rat, it has been found that chronic administration of daily doses of 30–300 mg. of the compounds of this invention per kg. of animal body weight will elicit the desired anti-inflammatory-analgesic effect without producing significant ulcerogenic effects, and that short term administration for acute conditions, the daily dosage is in the range of about 30–1000 mg./kg. of animal body weight. As expected, it is also to be found that in the treatment of larger animals, such as the dog, the daily dosage is about 20–300 mg. per kg. of body weight, whereas with still larger animals, such as those mammals having an adult body weight of about 70 kg., the daily oral dosage is about 15–300 mg. per kg. of body weight. Of course, in all instances the optimum daily oral dosage level useful in the control of arthritic and other herein described conditions will vary depending upon the activity of the specific compound and the severity of the condition being treated, and the reaction sensitivity of the patient. It is also to be found that significantly smaller doses may be administered when it is desired to effect only analgesic effects. Thus, the compounds of this invention have significantly enhanced the functional-use indices of the anilinonicotinic acid class of compounds in the treatment of pain and inflammatory conditions. It is also to be noted that the glyceryl esters of this invention have also significantly increased the water solubility characteristics over that of the prior art compounds and at the same time have unexpectedly lessened the bitter taste characteristic. Thus, the glyceryl anilinonicotinates of this invention are useful in treating pain and inflammation, especially that associated with rheumatoid and osteoporoses joint disease, collagen diseases, bursitis, gouty arthritis, spondylitis and the like.

As is true for most classes of therapeutically useful compounds, certain sub-classes and certain specific compounds are found to be more effective than other members of the general class. Of the glyceryl-2-anilinonicotinates of this invention, it is found that those compounds having disubstitution in the anilino portion of the molecule are most effective. For example, with the exception of glyceryl-2-(3-trifluoromethylanilino) nicotinate, those monosubstituted compounds are of lesser interest. Of the disubstituted compounds, it is found that those having substituents in either the 2- and 3-positions, or the 3- and 5-positions, or the 2- and 6-positions of the phenyl ring of the anilino portion of the molecule are most preferred. Representative of the preferred compounds of this invention are: glyceryl-2-(3-trifluoromethylanilino) nicotinate; glyceryl-2-(2-methyl-3-chloroanilino) nicotinate; glyceryl-2-(2-methyl-3-nitroanilino) nicotinate; glyceryl-2-(2,3-dichloroanilino) nicotinate; glyceryl-2-(2,3-dimethylanilino) nicotinate; glyceryl-2-(3-methyl-5-chloromethylanilino) nicotinate; glyceryl-2-(3-methyl-5-nitroanilino) nicotinate; glyceryl-2-(3,5-dichloroanilino) nicotinate; and glyceryl - 2 - (2,6 - dichloroanilino) nicotinate. Preferred glyceryl-2-(3,5,6-trisubstituted anilino) nicotinates or a glyceryl-2-(3,3,5-trisubstituted anilino) nicotinate are such compounds as represented by glyceryl-2 - (2 - methyl-3-chloro-6-nitroanilino) nicotinate; glyceryl-2-(2,3-dichloro-6-nitroanilino) nicotinate; glyceryl-2-(2,3-dimethyl-6-nitroanilino) nicotinate; glyceryl-2-(3,5-dimethyl-6-nitroanilino) nicotinate; glyceryl-2-(3,5-dichloro - 6 - nitroanilino) nicotinate; and glyceryl-2-(2,6-dichloro-3 - methylanilino) nicotinate.

It has been found that the alkylidenedioxypropyl-2-anilinonicotinate intermediates (i.e., those embraced by Formula (VI) and are prepared via the method of Example 4) also exhibit significant anti-inflammatory-analgesic effects and therefore, although of somewhat less potency than their hydrolysis products, they are therapeutically useful in the treatment of pain and inflammation, as well as being useful as chemical intermediates.

The therapeutic compositions of matter described herein may be administered parenterally or enterally. Preferably, the compounds are orally administered, said oral administration of the glyceryl 2-anilinonicotinates being best effected by incorporating them into dosage forms such as tablets, capsules, elixirs, solutions, suspensions and the like. Representative embodiments of the formulations containing the compositions of this invention are as follows:

TABLET FORMULATIONS

I. Formula and method of manufacture for glyceryl-2-(2-methyl-3-chloroanilino)-nicotinate, (enteric coated tablets)

Formula: Mg./core

Glyceryl-2-(2-methyl-3-chloroanilino)-nicotinate, micronized _____ 100.0
Citric Acid _____ 1.0
Lactose, USP _____ 33.5
Dicalcium phosphate _____ 70.0
Pluronic F-68 _____ 30.0
Sodium lauryl sulfate _____ 15.0
Polyvinylpyrrolidone _____ 15.0
Carbowax 1500 _____ 4.5
Carbowax 6000 _____ 45.0
3A alcohol, 50 ml./100 cores.
Corn starch _____ 30.0
Dry:
Sodium lauryl sulfate _____ 3.0
Magnesium stearate _____ 3.0

Tablet weight _____ 350.0

Procedure.—The glyceryl-2-(2-methyl - 3 - chloroanilino)-nicotinate is mixed with the citric acid, lactose, dicalcium phosphate, pluronic and sodium lauryl sulfate. The above mixture is screened through a No. 60 screen and damp granulated with an alcoholic solution consisting of polyvinylpyrrolidone, Carbowax 1500 and 6000. Add additional alcohol, if necessary, to bring powders to a pasty mass. Add corn starch and continue mixing until uniform granules are formed. Pass through a No. 10 screen, tray and dry in oven at 100° C. for 12–14 hours. Reduce dried granulation through a No. 16 screen add sodium lauryl sulfate and magnesium sulfate, mix and compress into desired shape on a tablet machine.

Pluronic F-68 is a U.S. registered trademark for a non-ionic surface-active agent prepared by the addition of ethylene oxide to a polypropylene glycol which has a molecular weight of 1750.

Coating.—The above cores are treated with a lacquer and dusted with talc to prevent moisture adsorption. Subcoat layers are added to round out the core. A sufficient number of lacquer coats are applied to make the core enteric. Additional sub-coats and smoothing coats are applied to completely round out and smooth the tablet. Color coats are applied until desired shade is obtained. After drying the coated tablets are polished to give the tablets an even gloss.

II. Capsule formulations

Formula: mg./capsule

Glyceryl-2-(2-methyl - 3 - nitroanilino)nicotinate, micronized _____ 100.00
Citric acid _____ 1.00
Pluronic, F-68 _____ 40.00
Sodium lauryl sulfate _____ 20.00
Lactose _____ 238.00
Magnesium stearate _____ 101.00

400.00

Procedure.—Mix together glyceryl - 2 - (2-methyl-3-nitroanilino)-nicotinate, citric acid, pluronic, sodium lauryl sulfate and lactose. Pass through a No. 80 screen. Add magnesium stearate, mix and encapsulate into the proper size 2 piece gelatin capsule.

III. Oral suspension

Formula:
Glyceryl-2-(2 - methyl - 3 - chloroanilino)-nicotinate, micronized _____mg./5 ml__ 100.0
Veegum, Vanderbilt _____mg./5 ml__ 50.0
Standard granulated sugar, USP_mg./5 ml__ 2500.0
Sorbitol solution, USP _____mg./5 ml__ 1250.0
Sodium Saccharin, NF _____mg./5 ml__ 50.0
Sodium benzoate, USP _____mg./5 ml__ 5.0
Ethanol, USP _____ml__ 0.025
Menthol, USP _____mg./5 ml__ 1.000
Flavor, q.s.
Purified water, USP, to make _____ml__ 5

Method of preparation.—Dissolve the sodium saccharin, sodium benzoate, standard granulated sugar and sorbitol solution in approximately 80% of the required amount of water. Disperse the Veegum in approximately 5% of the required amount of water and add the dispersion to the previously prepared syrup. Prepare a slurry of the glyceryl-2-(2-methyl-3-chloroanilino) - nicotinate with approximately 10% of the required amount of water and pass through a suitable colloid mill until free of grittiness. Add the milled active slurry to the batch. Dissolve the menthol and flavor in the alcohol and add the resulting solution to the batch. Add sufficient purified water to bring the batch to total volume. Agitate until uniform.

IV. Suppository

Formula:
Glyceryl-2-(2-methyl - 3 - chloroanilino)nicotinate, micronized _____mg./2 gms__ 100
Theobroma oil, pharm. grade to make __gms__ 2

Method of preparation.—Prepare a slurry of the glyceryl-2-(2 - methyl - 3 - chloroanilino)-nicotinate with a portion of the melted theobroma oil and pass the slurry through a suitable colloid mill until it is free of grittiness. Add sufficient melted theobroma oil to bring the batch to final weight. Pour the melted mix, while maintaining uniformity, into approximately prepared molds and allow to cool.

V. Topical ointment

Formula:
Glyceryl - 2 - (2 - methyl - 3 - chloroanilino)-nicotinate, micronized _____mg./gm__ 20.0
Methylparaben, USP _____mg./gm__ 0.5
Propylparaben, USP _____mg./gm__ 0.1
Petrolatum, USP to make _____gm__ 1

Method of manufacture.—Dissolve the parabens in the melted petrolatum. Prepare a slurry of the glyceryl-2-(2-methyl-3-chloroanilino)- nicotinate with a portion of the paraben solution. Pass the slurry through a suitable colloid mill until free of grittiness. Add the slurry to the remainder of the paraben solution and mix while cooling to room temperature.

I claim:
1. A compound of the group having the structural formula:

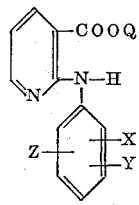

wherein X is a member of the group consisting of lower alkyl, lower alkoxy, halogeno, nitro, trifluoromethyl, each of Z and Y is a member of the group consisting of lower alkyl, halogeno, trifluoromethyl and hydrogen, Q is a member of the group consisting of —CH$_2$CHOHCH$_2$OH, cyanomethyl, acetonyl, carbamylmethyl, phenacyl, carbethoxymethyl,

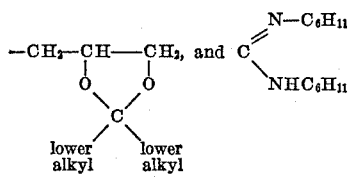

with a proviso, that when one of Y and Z is hydrogen, the other in combination with X are other than 3,4 and 3,6 disubstituted compounds.

2. A compound of claim 1, wherein Q is

—CH$_2$CHOHCH$_2$OH

X is lower alkyl and Y is halogeno, and Z is hydrogen.

3. A compound of claim 2 wherein Q is

—CH$_2$CHOHCH$_2$OH

X is methyl, Y is chloro, said compound being glyceryl-2-(2-methyl-3-chloroanilino) nicotinate.

4. A compound of claim 1 wherein Q is

—CH$_2$CHOHCH$_2$OH

Y is lower alkyl and X is nitro, and Z is hydrogen.

5. A compound of claim 4 wherein Q is

—CH$_2$CHOHCH$_2$OH

Y is methyl and X is nitro, said compound being glyceryl-2-(2-methyl-3-nitroanilino) nicotinate.

6. A compound of claim 1 wherein X is lower alkyl, Y is halogeno and Q is

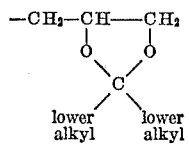

and Z is hydrogen.

7. A compound of claim 6 wherein X is methyl, Y is chloro and Q is β,γ-isopropylidenedioxypropyl, said compound being β,γ - isopropylidenedioxy-2-(2-methyl - 3-chloroanilino) nicotinate.

8. A compound of claim 1 wherein Y is methyl, X is nitro and Q is

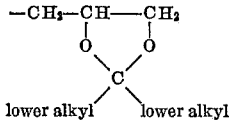

and Z is hydrogen.

9. A compound of claim 8 wherein Q is

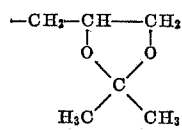

Y is methyl, said compound being β,γ-isopropylidenedioxy-2-(2-methyl-3-nitroanilino) nicotinate.

References Cited

UNITED STATES PATENTS 2,408,905   10/1946   Black et al. _____ 260—343 XR

HENRY R. JILES, Primary Examiner

ALAN L. ROTMAN, Assistant Examiner

U.S. Cl. X.R.

260—294.9; 424—266